US010471360B2

(12) United States Patent
Trombetta et al.

(10) Patent No.: US 10,471,360 B2
(45) Date of Patent: Nov. 12, 2019

(54) USER-DRIVEN SPECTATOR CHANNEL FOR LIVE GAME PLAY IN MULTI-PLAYER GAMES

(71) Applicant: Sony Interactive Entertainment LLC, San Mateo, CA (US)

(72) Inventors: Steven Trombetta, San Mateo, CA (US); James Fairbairn, San Mateo, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 15/450,602

(22) Filed: Mar. 6, 2017

(65) Prior Publication Data

US 2018/0250600 A1 Sep. 6, 2018

(51) Int. Cl.
| | | |
|---|---|---|
| A63F 13/85 | (2014.01) | |
| A63F 13/86 | (2014.01) | |
| A63F 13/35 | (2014.01) | |
| A63F 13/537 | (2014.01) | |
| H04L 29/06 | (2006.01) | |
| H04N 21/478 | (2011.01) | |
| H04N 21/488 | (2011.01) | |

(Continued)

(52) U.S. Cl.
CPC ........... *A63F 13/86* (2014.09); *A63F 13/35* (2014.09); *A63F 13/537* (2014.09); *H04L 65/4076* (2013.01); *H04N 21/4758* (2013.01); *H04N 21/4781* (2013.01); *H04N 21/4788* (2013.01); *H04N 21/4882* (2013.01)

(58) Field of Classification Search
CPC . H04L 65/4069; H04N 21/2353; A63F 13/85; A63F 13/30; A63F 13/335; A63F 13/352
USPC ...................................................... 463/40–42
See application file for complete search history.

(56) References Cited

U.S. PATENT DOCUMENTS

| | | |
|---|---|---|
| 5,729,471 A | 3/1998 | Jain et al. |
| 5,995,518 A | 11/1999 | Burns et al. |

(Continued)

FOREIGN PATENT DOCUMENTS

| | | |
|---|---|---|
| WO | WO 2014/109435 | 7/2014 |
| WO | WO 2018/160274 | 9/2018 |

(Continued)

OTHER PUBLICATIONS

U.S. Appl. No. 15/448,356 Final Office Action dated Aug. 31, 2018.

(Continued)

*Primary Examiner* — David L Lewis
*Assistant Examiner* — Ross A Williams
(74) *Attorney, Agent, or Firm* — Polsinelli LLP

(57) ABSTRACT

A multi-user system hosts a game session over a communication network. The game session includes a plurality of media streams that show one or more views of live game play for the game session. The multi-user system further assigns a spectator value to each media stream, updates one or more spectator values based on user inputs received during the game session, selects, for one or more time periods of the game session, one media stream to broadcast based on the spectator value assigned to the one media stream for the one or more time periods, and broadcasts the one media stream over the communication network.

19 Claims, 11 Drawing Sheets

(51) Int. Cl.
H04N 21/475 (2011.01)
H04N 21/4788 (2011.01)

(56) References Cited

U.S. PATENT DOCUMENTS

| | | | |
|---|---|---|---|
| 6,631,522 B1 | 10/2003 | Erdelyi | |
| 6,877,134 B1 | 4/2005 | Fuller et al. | |
| 7,499,475 B2* | 3/2009 | Kashiwagi | H04L 1/0045 370/328 |
| 8,025,572 B2* | 9/2011 | Spanton | A63F 13/12 345/473 |
| 8,187,104 B2 | 5/2012 | Pearce | |
| 8,202,167 B2 | 6/2012 | Ackely et al. | |
| 8,645,844 B1 | 2/2014 | Strobel et al. | |
| 9,233,305 B2 | 1/2016 | Laakkonen et al. | |
| 9,473,825 B2 | 10/2016 | Gossweiler et al. | |
| 9,782,678 B2* | 10/2017 | Long | A63F 13/497 |
| 9,860,477 B2* | 1/2018 | Kummer | H04N 5/50 |
| 9,968,856 B1* | 5/2018 | Ninoles | A63F 13/86 |
| 2003/0177347 A1 | 9/2003 | Schneier et al. | |
| 2004/0147306 A1 | 7/2004 | Randall et al. | |
| 2004/0189701 A1 | 9/2004 | Badt | |
| 2006/0105827 A1 | 5/2006 | Metzger et al. | |
| 2007/0018952 A1 | 1/2007 | Arseneau et al. | |
| 2007/0021058 A1 | 1/2007 | Aresneau et al. | |
| 2007/0117635 A1 | 5/2007 | Spanton et al. | |
| 2008/0113815 A1 | 5/2008 | Weingardt et al. | |
| 2008/0200254 A1 | 8/2008 | Cayce et al. | |
| 2009/0036214 A1 | 2/2009 | Dahl | |
| 2009/0208181 A1 | 8/2009 | Cottrell | |
| 2009/0225828 A1 | 9/2009 | Perlman et al. | |
| 2009/0271821 A1 | 10/2009 | Zalewski | |
| 2011/0275431 A1 | 11/2011 | Hirzel et al. | |
| 2012/0093481 A1 | 4/2012 | McDowell et al. | |
| 2013/0007013 A1 | 1/2013 | Geisner et al. | |
| 2013/0324239 A1 | 12/2013 | Ur et al. | |
| 2014/0004951 A1 | 1/2014 | Kern et al. | |
| 2014/0087846 A1 | 3/2014 | Bryan et al. | |
| 2014/0087851 A1 | 3/2014 | Low et al. | |
| 2014/0142921 A1 | 5/2014 | Gleadall et al. | |
| 2014/0171039 A1 | 6/2014 | Bjontegard | |
| 2014/0297408 A1 | 10/2014 | Zabala | |
| 2015/0018990 A1 | 1/2015 | Shachar et al. | |
| 2015/0113548 A1 | 4/2015 | Stern et al. | |
| 2015/0248792 A1 | 9/2015 | Abovitz et al. | |
| 2015/0348373 A1 | 12/2015 | Weingardt et al. | |
| 2016/0051895 A1 | 2/2016 | Hood | |
| 2016/0310843 A1 | 10/2016 | Webb | |
| 2016/0365121 A1 | 12/2016 | DeCaprio | |
| 2017/0001111 A1 | 1/2017 | Willette et al. | |
| 2017/0001112 A1 | 1/2017 | Gilmore et al. | |
| 2017/0003740 A1 | 1/2017 | Verfaillie et al. | |
| 2017/0006074 A1* | 1/2017 | Oates, III | H04L 65/4069 |
| 2017/0072324 A1 | 3/2017 | Navok et al. | |
| 2017/0113143 A1 | 4/2017 | Marr | |
| 2017/0157512 A1 | 6/2017 | Long et al. | |
| 2017/0266549 A1 | 9/2017 | Paradise | |
| 2017/0266552 A1 | 9/2017 | Paradise et al. | |
| 2017/0270751 A1 | 9/2017 | Paradise | |
| 2017/0332131 A1 | 11/2017 | Opsenica et al. | |
| 2018/0139257 A1* | 5/2018 | Ninoles | H04L 65/4076 |
| 2018/0192144 A1 | 7/2018 | McElroy | |
| 2018/0250598 A1 | 9/2018 | Trombetta | |
| 2019/0262705 A1 | 8/2019 | Trombetta | |
| 2019/0262706 A1 | 8/2019 | Trombetta | |
| 2019/0262712 A1 | 8/2019 | Trombetta | |
| 2019/0262713 A1 | 8/2019 | Trombetta | |
| 2019/0262717 A1 | 8/2019 | Thielbar | |
| 2019/0262720 A1 | 8/2019 | Trombetta | |
| 2019/0262723 A1 | 8/2019 | Trombetta | |
| 2019/0262724 A1 | 8/2019 | Trombetta | |
| 2019/0262727 A1 | 8/2019 | Trombetta | |
| 2019/0266845 A1 | 8/2019 | Trombetta | |

FOREIGN PATENT DOCUMENTS

| | | |
|---|---|---|
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2018/013378 International Search Report and Written Opinion dated Mar. 8, 2018.
PCT Application No. PCT/US2018/021197 International Search Report and Written Opinion dated May 30, 2018.
U.S. Appl. No. 15/448,356, filed Mar. 2, 2017, Steven Trombetta, System and Method for Managing Online Gaming League.
PCT/US18/13378, System and Method for Managing Online Gaming League, Jan. 11, 2018.
PCT/US18/21197, User-Drive Spectator Channel for Live Game Play in Multi-Player Games, Mar. 6, 2017.
U.S. Appl. No. 15/908,569, filed Feb. 28, 2018, Chris Thielbar, Online Tournament Integration.
U.S. Appl. No. 15/908,722, filed Feb. 28, 2018, Steven Trombetta, Statistical Driven Tournaments.
U.S. Appl. No. 15/908,635, filed Feb. 28, 2018, Steven Trombetta, Statistically Defined Game Channels.
U.S. Appl. No. 15/908,531, filed Feb. 28, 2018, Steven Trombetta, Integrating Commentary Content and Gameplay Content Over a Multi-User Platform.
U.S. Appl. No. 15/908,657, filed Feb. 28, 2018, Steven Trombetta, De-interleaving Gameplay Data.
U.S. Appl. No. 15/908,438, filed Feb. 28, 2018, Steven Trombetta, Incentivizing Players to Engage in Competitive Gameplay.
U.S. Appl. No. 15/908,345, filed Feb. 28, 2018, Steven Trombetta, Player to Spectator Handoff and Other Spectator Controls.
U.S. Appl. No. 15/908,704, filed Feb. 28, 2018, Steven Trombetta, Scaled VR Engagement and Views in an E-sports Event.
U.S. Appl. No. 15/908,712, filed Feb. 28, 2018, Steven Trombetta, Discovery and Detection of Events in Interactive Content.
U.S. Appl. No. 15/908,707, filed Feb. 28, 2018, Steven Trombetta, Creation of Winner Tournaments With Fandom Influence.
U.S. Appl. No. 15/448,356 Office Action dated Mar. 5, 2018.
PCT Application No. PCT/US2019/015120 International Search Report and Written Opinion dated Apr. 15, 2019.
PCT Application No. PCT/US2019/015124 International Search Report and Written Opinion dated Apr. 15, 2019.
PCT Application No. PCT/US2019/016686 International Search Report and Written Opinion dated Apr. 10, 2019.
PCT Application No. PCT/US2019/016698 International Search Report and Written Opinion dated Apr. 11, 2019.
PCT Application No. PCT/US2019/016694 International Search Report and Written Opinion dated Apr. 15, 2019.
PCT Application No. PCT/US2019/017100 International Search Report and Written Opinion dated Apr. 17, 2019.
PCT/US19/17100, Online Tournament Integration, Feb. 7, 2019.
PCT/US19/15120, Statistical Driven Tournaments, Jan. 25, 2019.
PCT/US19/15124, Statistically Defined Game Channels, Jan. 25, 2019.
PCT/US19/15273, Integrating Commentary Content and Gameplay Content Over a Multi-User Platform, Jan. 25, 2019.
PCT/US19/15275, De-Interleaving Gameplay Data, Jan. 25, 2019.
PCT/US18/16180, Incentivizing Players to Engage in Competitive Gameplay, Jan. 31, 2019.
PCT/US19/16167, Player to Spectator Handoff and Other Spectator Controls, Jan. 31, 2019.
PCT/US19/16694, Scaled VR Engagement and Views in an E-sports Event, Feb. 5, 2019.

(56) References Cited

OTHER PUBLICATIONS

PCT/US19/16686, Discovery and Detection of Events in Interactive Content, Feb. 5, 2019.
PCT/US19/16698, Creation of Winner Tournaments With Fandom Influence, Feb. 5, 2019.
U.S. Appl. No. 15/448,356 Office Action dated Jan. 8, 2019.
PCT Application No. PCT/US2019/015123 International Search Report and Written Opinion dated Apr. 23, 2019.
PCT Application No. PCT/US2019/015125 International Search Report and Written Opinion dated Apr. 23, 2019.
PCT Application No. PCT/US2019/016180 International Search Report and Written Opinion dated Apr. 23, 2019.
U.S. Appl. No. 15/908,569 Office Action dated Jun. 28, 2019.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,704 Office Action dated Jun. 28, 2019.
U.S. Appl. No. 15/908,707 Office Action dated Jul. 17, 2019.
U.S. Appl. No. 15/448,356 Final Office Action dated Aug. 6, 2019.
U.S. Appl. No. 15/908,712 Office Action dated Aug. 8, 2019.

\* cited by examiner

USER-DRIVEN SPECTATOR CHANNEL FOR LIVE GAME PLAY IN MULTI-PLAYER GAMES

TECHNICAL FIELD

The present disclosure generally relates to multi-user network platforms, and more particularly to spectators viewing live-gameplay for a game session.

BACKGROUND

Advances in network connectivity, speed, convenience, and the like, support an ever increasing community of online consumers who spectate and/or participate in live online game play, which is often hosted by a multi-user network platform. In fact, within the community of these online consumers, highly skilled players can achieve celebrity status and attract a large following of fans. Similarly, various multiplayer games have also seen dramatic increases in popularity and attract an ever increasing number of participants and spectators alike.

Parallels can be drawn between traditional consumers of physical real-world activities or sports, such as card games, board games, football, basketball, baseball, and the like, and the online consumers for multiplayer or multi-user games. For example, traditional consumers and the online consumers often watch a particular player, team, sport, or game, and access various media outlets to watch highlights, follow players, and the like. Industries and businesses that provide content for physical real-world activities, such as live-game play, use sophisticated hardware such as cameras, wires, cables, suspensions, etc., to capture different views of the live-game play in order to provide informative and immersive viewing experiences. However, creating similar viewing experiences for online consumers of multiplayer or multi-user games presents new challenges due, in part, to an underlying inherent virtual or online nature of such multi-player or multi-user games. As the community of online consumers continues to grow, so too does a demand to improve the online consumer's viewing experience.

SUMMARY

The following summary describes one or more embodiments of this disclosure. This summary is provided to discuss exemplary embodiments and is not intended to limit any aspects of the subject disclosure. Moreover, while the embodiments described in this summary represent the perspective of a multi-user system or platform, however, it is to be understood other methods, devices, non-transitory computer-readable storage media, and the like may be readily employed to perform the same or substantially similar operations described herein.

In one exemplary embodiment, the multi-user system includes one or more network interfaces to communicate with a communication network, a processor coupled to the network interfaces and adapted to execute one or more processes, and a memory configured to store a process executable by the processor. The process, when executed, is operable to host a game session that is accessible over the communication network, define a spectator attribute for each media stream of a plurality of media streams associated with the game session. Notably, each media stream corresponds to a view of live game play for the game session. The process is further operable to update a current spectator value associated with each spectator attribute based on user inputs received in a time period of the live game play and designate one media stream as a spectator stream for the time period of the live game play based on its current spectator value. The process is also operable to integrate the spectator stream for each time period into a spectator channel of the live game play for the game session and broadcast the spectator channel over the communication network. Notably, the spectator channel provides one or more views of the live game play for the game session based on the one media stream designated as the spectator stream for the time period of live game play In some aspects of the above exemplary embodiment, the spectator attribute includes one or more of a number of users viewing the each media stream, a change or trend in the number of users viewing the each media stream, a number of users that follow a player associated with the each media stream, a change or trend in the number of users that follow the player, a number of points awarded to the player, a change or trend in the number of points awarded to the player, or a proximity between the player and potential point awards.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the term "user" refers to a user of an electronic device(s) and can include participants or players as well as non-participants or spectators. Actions performed by a user in the context of computer software shall be considered to be actions taken by a user to provide an input to the electronic device(s) to cause the electronic device to perform the steps embodied in computer software. The terms "stream" or "media stream" are synonymous and generally refer to data or content associated with an online game or an online game session.

As discussed in greater detail below, the subject disclosure relates to a user-driven spectator channel that shows live game play for multi-player games. The user-driven spectator channel improves an online consumer's viewing experience of live online game play and particularly integrates and/or switches between multiple media streams corresponding to live game play during a game session based on user inputs or feedback. For example, a multi-user platform or system can host a game session over a communication network and receive user inputs that correspond to interest, popularity, or preference in one or more media streams that show live game play for the game session. The multi-user platform may include a stream integration engine or module that prioritizes and designates portions of the media streams to broadcast in a given time period based on the user inputs for the given time period (or leading up to the given time period). The multi-user platform and/or the stream integration engine can further compile or integrate the designated portions of the media streams into a spectator channel and broadcast the spectator channel to users over the network. In this fashion, the spectator channel shows different views and/or perspectives of the live game play in the game session based on current user feedback for live game play.

Figure 1:
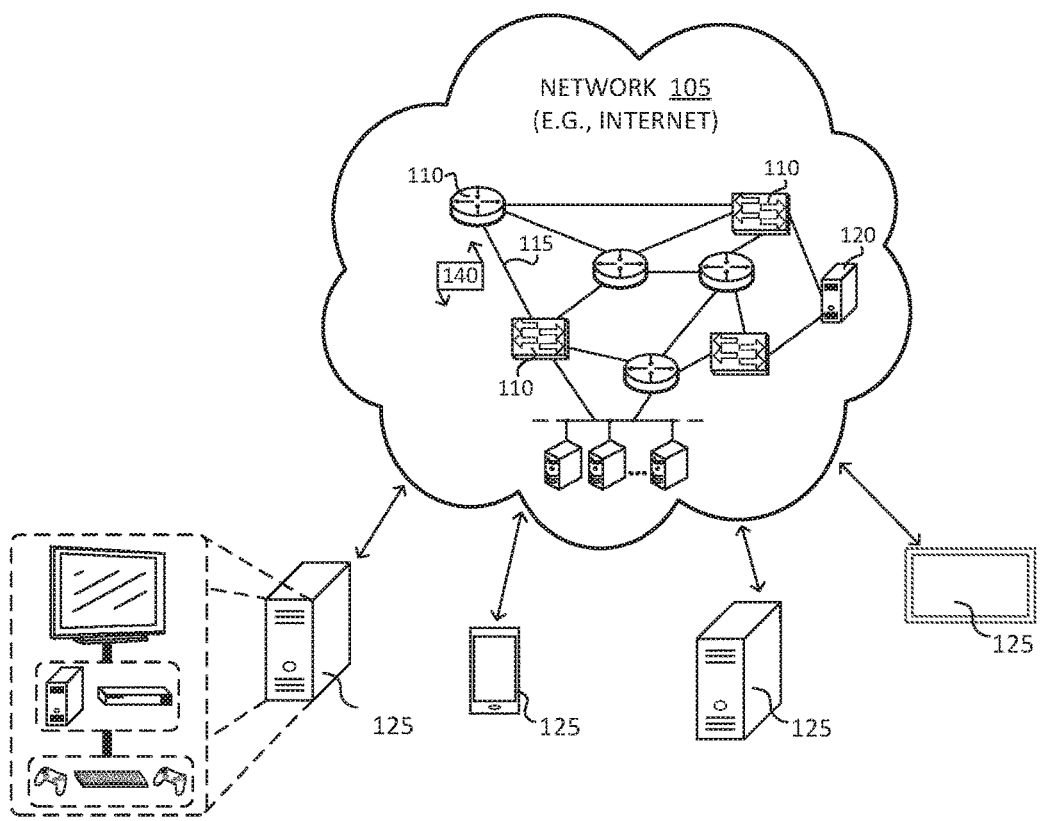
FIG. 1 illustrates a schematic diagram of an example communication network.

Referring to the figures, FIG. 1 illustrates a schematic diagram 100 of an example communication network 105 (e.g., the Internet). Communication network 105 is shown for purposes of illustration and represents various types of networks, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

As shown, communication network 105 includes a geographically distributed collection of devices or nodes 110/120, interconnected by communication links 115 and/or network segments for exchanging data such as data packets and for transporting data to end nodes or devices 125 such as personal computing devices, online game systems, or other devices, such as sensors, etc. As shown, device 120 represents a multi-user platform or system. Further, communication links 115 represent wired links or shared media links (e.g., wireless links, PLC links, etc.) where certain devices/nodes, such as, e.g., routers, servers, switches, sensors, computers, etc., may be in communication with other nodes, based on distance, signal strength, current operational status, location, etc. Those skilled in the art will understand that any number of nodes, devices, links, etc. may be used in the communication network, and that the view shown herein is for simplicity Data packets 140 such as network traffic/messages are exchanged between devices over and within communication network 105 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the devices or nodes interact with each other.

Notably, one of end nodes or devices 125 is illustrated as representing a network game system, which includes a game console, peripheral devices, and display hardware. Operatively, a user of device 125 can play, spectate, or otherwise access online games and game sessions hosted by multi-user platform 120 over network 105. Likewise, multi-user platform 120 receives user inputs over network 105 corresponding to its hosted online games or game sessions.

Figure 2:
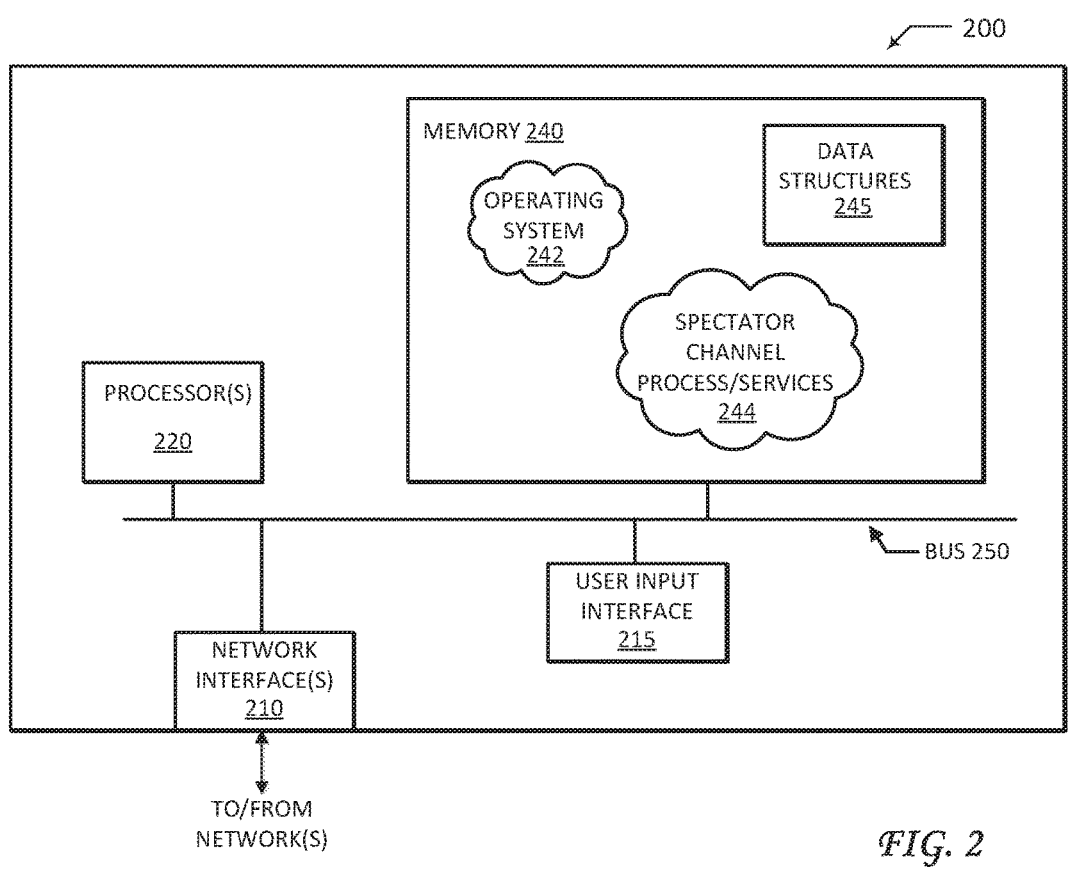
FIG. 2 illustrates a block diagram of an example network device/node.

FIG. 2 illustrates a block diagram of an example network device/node that represents a multi-user system such as multi-user platform 120 or components thereof. Device 200 includes one or more network interfaces 210, a user input interface 215, at least one processor 220, and a memory 240 interconnected by a system bus 250.

Network interface(s) 210 contain the mechanical, electrical, and signaling circuitry for communicating data over links coupled to one or more of the networks shown in hybrid cloud environment 100. Network interfaces 210 are configured to transmit and/or receive data using a variety of different communication protocols, as will be understood by those skilled in the art.

User input interface 215 includes graphical user interfaces to solicit and receive user input during live game play for a game session. For example, user input interface 215 can include a voting interface and/or interactive graphical elements that can be manipulated by a user to provide user input during live game play. Such interactive graphical elements can include, for example, various buttons, fields such as text fields or text boxes, selectable elements, and the like.

Memory 240 comprises a plurality of storage locations that are addressable by processor 220 for storing software programs and data structures associated with the embodiments described herein.

Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "spectator channel" process/service 244. Note that while processes/services 244 are shown in centralized memory 240, these processes/services may be configured to operate in a distributed communication network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having spectator channel process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
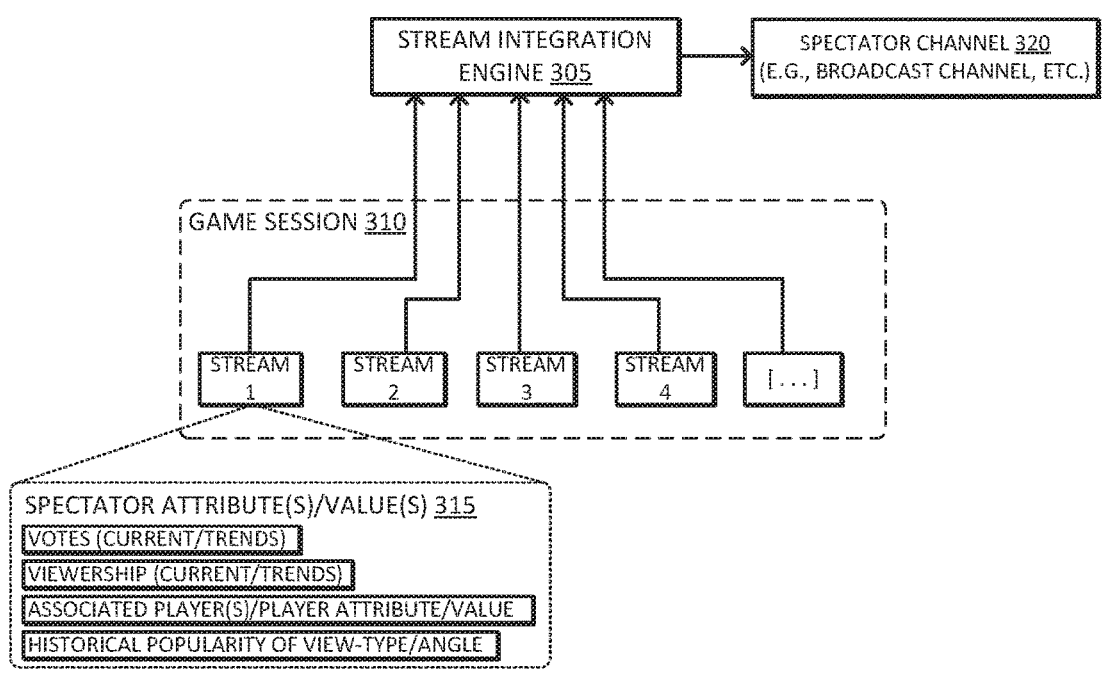
FIG. 3 illustrates a block diagram of a stream integration engine employed by a multi-user platform, showing media streams having respective spectator attributes.

FIG. 3 illustrates a block diagram 300 of a stream integration engine 305 employed by a multi-user platform or system. As shown, stream integration engine 305 monitors multiple media streams associated with game session 310. Here, the media streams associated with game session 310 include stream 1, stream 2, stream 3, and stream 4 and represent display content or views of live game play in game session 310. The display content can, for example, include individual player views (e.g., first-person perspective views, third-person perspective views, etc.), top-down views, birds-eye views, two-dimensional (2D) views, ¾ views, fixed three-dimensional (3D) views, omni-directional views, god's-eye views, and other views showing live game play for game session 310.

Stream integration engine 305 further assigns one or more spectator attributes 315 to respective media streams, where each spectator attribute 315 has a corresponding spectator value. Spectator attributes 315 include, for example, user votes, viewership, associated players or associated player attribute, a historical popularity of a view-type or view angle, and the like. As discussed herein, the terms "spectator attribute" and/or "spectator value" are used synonymously, and generally correspond to an interest, popularity, or preference for respective media streams. The spectator value can reflect a current preference or popularity or it can reflect a trend such as changes or derivatives of the current preferences for a given time period. Generally, higher or larger spectator values represent a stronger preference; however any value system may be used, as is appreciated by those skilled in the art.

In operation, stream integration engine 305 monitors media streams 1-4 and continuously updates respective spectator attributes/values 315 during live game play in game session 310 based, in part, on current user inputs. With respect to user inputs, the multi-user platform and/or stream integration engine 305 provide a user input interface, such as user input interface 215 (described above), that includes interactive graphical elements to solicit and receive user input during the live game play. Examples of user inputs that indicate interest or preference in a particular media stream include votes, viewership, or other indications of preference for the media stream. Notably, the "associated player value/attribute" is discussed in greater detail with respect to FIG. 4, below. As discussed below, one or more of these spectator attributes may be considered independently or in combination with other spectator attributes—e.g., FIG. 4 considers player attributes/values 415 independent of other spectator attributes. Further, certain spectator values/attributes represent a weight that applies to other spectator values/attributes, as is appreciated by those skilled in the art.

Still referring to FIG. 3, stream integration engine 305 compares individual or aggregated spectator values for respective media streams during live game play and determines a priority ranking for each media stream in a given time period of live game play. Stream integration engine 305, as discussed, continuously updates respective spectator values 315 during live game play based on current user inputs and further compares or ranks spectator values for corresponding media streams to determine user preferences for viewing one media stream over another media stream. Stream integration engine 305 further designates one of the media streams to broadcast for a given time period based on its then-current priority rank. The media stream designated for the given time period is further broadcast in a spectator channel 320 over the network. As shown, spectator channel 320 represents an integration of portions of each designated media stream (for the given time period). Stream integration engine 305 stitches or compiles the portions of currently designated media streams into spectator channel 320. Throughout game session 310, stream integration engine 305 switches between media streams 1-4 based on the priority rank for respective media streams in a given time period. In this fashion, spectator channel 320 provides user-preferred media content that shows different views of live game play during game session 310. Generally, a single media stream is designated to broadcast per given time period. However, it is also appreciated more than one media stream may be broadcast per given time period.

Figure 4:
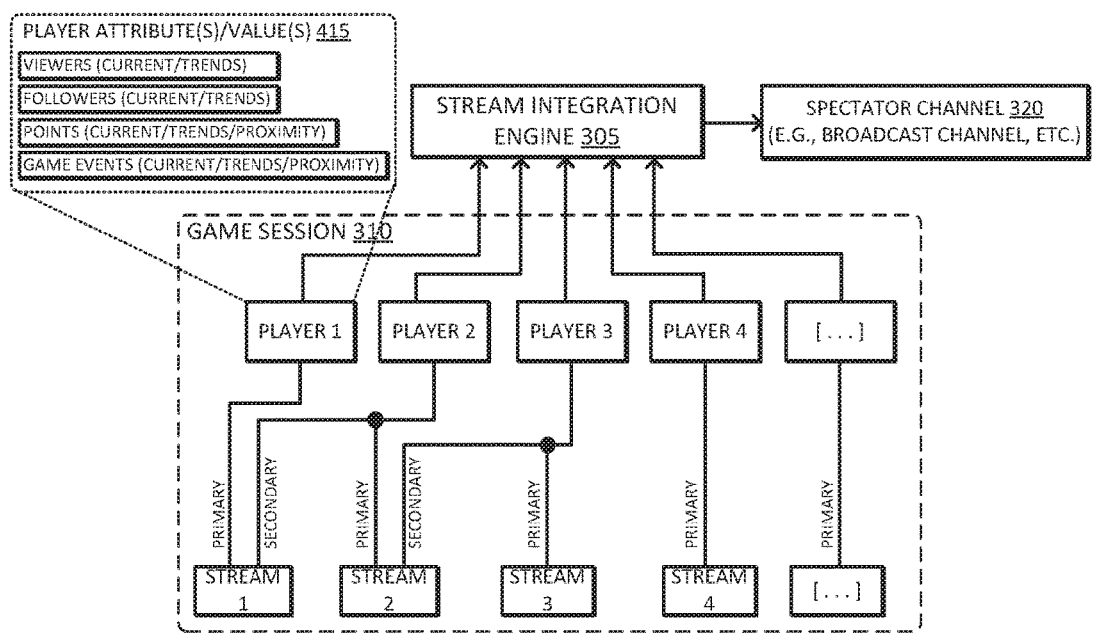
FIG. 4 illustrates a block diagram of the stream integration engine shown in FIG. 3, further showing media streams organized according to player attributes.

FIG. 4 illustrates a block diagram 400 of stream integration engine 305, further showing media streams 1-4 organized and/or prioritized according to player attribute(s)/value(s) 415. As discussed above, player attributes 415 can be considered as part of spectator attributes 315, or as shown here, player attributes may be independently considered. Player attributes 415, like spectator attributes 315, are associated with a respective media stream and each player attribute 415 has a corresponding player value.

Player attributes 415 include, for example, a number of viewers currently watching the player, a number of users following (e.g., "followers") the player, a number of points, game event(s), and the like. As discussed herein, the terms "player attribute" and/or "player value" are used synonymously, and generally correspond to an interest, popularity, or preference for media streams associated with a respective player. Moreover, these terms may represent a particular type of spectator attribute/value, discussed above. Generally, the player value can reflect a current preference or popularity or it can reflect a trend such as changes or derivatives of the current preferences for a given time period. In addition, the player value can reflect a proximity to a game event such as a level change, an opportunity for points, and the like. Generally, higher or larger player values represent a stronger preference; however any value system may be used, as is appreciated by those skilled in the art.

Diagram 400 also shows some media streams associated with more than one player. In these instances, the media streams are further labeled as a "primary" media stream or a "secondary" media stream for the respective player. Here, stream 1 a primary media stream for player 1 and a secondary media stream for player 2, and stream 2 is a primary media stream for player 2 and a secondary media stream for player 3.

Primary and secondary attributes or values delineate different views or viewing angles for the same player. For example, media stream 1 for game session 310 shows display content for a first person point of view corresponding to player 1 and is labeled as a "primary" media stream for player 1. Media stream 2 shows display content for a first person point of view corresponding to player 2 and is labeled as a "primary" media stream for player 2. During live game play, player 2 enters the first person point of view corresponding to player 1 (media stream 1). When this occurs, player 2 is represented by the display content shown by media stream 1 as well as the display content shown by media stream 2. But the display content of media stream 1 is focused on player 1 while player 2 is only temporarily shown by media stream 1. Accordingly, since player 2 is not the focus of media stream 1, media stream 1 is assigned as a "secondary" media stream for player 2 (during the time period player 2 is represented by the display content shown by media stream 1). Alternatively, or in addition to the above, game session 310 may include various other views that show different angles for players and may be labeled as primary or secondary media streams, as appropriate. It is also appreciated that the labels primary and secondary are for purposes of illustration, not limitation. Any type of label, value, and/or weight may be assigned to media streams to indicate a relationship or association with one or more players.

In operation, stream integration engine 305 continuously updates the player values in the same fashion it updates spectator values—e.g., based on user input received during live game play in game session 310. For example, the multi-user system, user input interface(s) and/or stream integration operations discussed above are employed here to solicit and receive user inputs, update respective player attributes/values 415 during live game play, compare individual or aggregated player values for respective media streams, determine a priority ranking for each media stream in a given time period of live game play, and designate one of the media streams to broadcast for the given time period based on its then-current priority rank.

In addition to user inputs received during live game play, spectator integration engine 305 also updates player values based on data outside of game session 310. With respect, data outside of live game play, the multi-user system and/or spectator integration engine 305 receives non-game specific information regarding a popularity of a player. Examples of this information include information regarding a number of "followers" or "friends" (outside of game play) as well as other data metrics that indicate player popularity. Put differently, a user may be a fan of particular player and can indicate interest in the player by following, friending, or otherwise showing a connection to the particular player. The user input interface(s) and/or stream integration engine 305 receives data outside of live game play and assigns an appropriate player value to a corresponding player attribute 415. Generally, higher or larger player values represent more popularity or stronger preference (e.g., a larger number of followers, likes, friends, etc.); however any value system may be used, as is appreciated by those skilled in the art.

Figure 5:
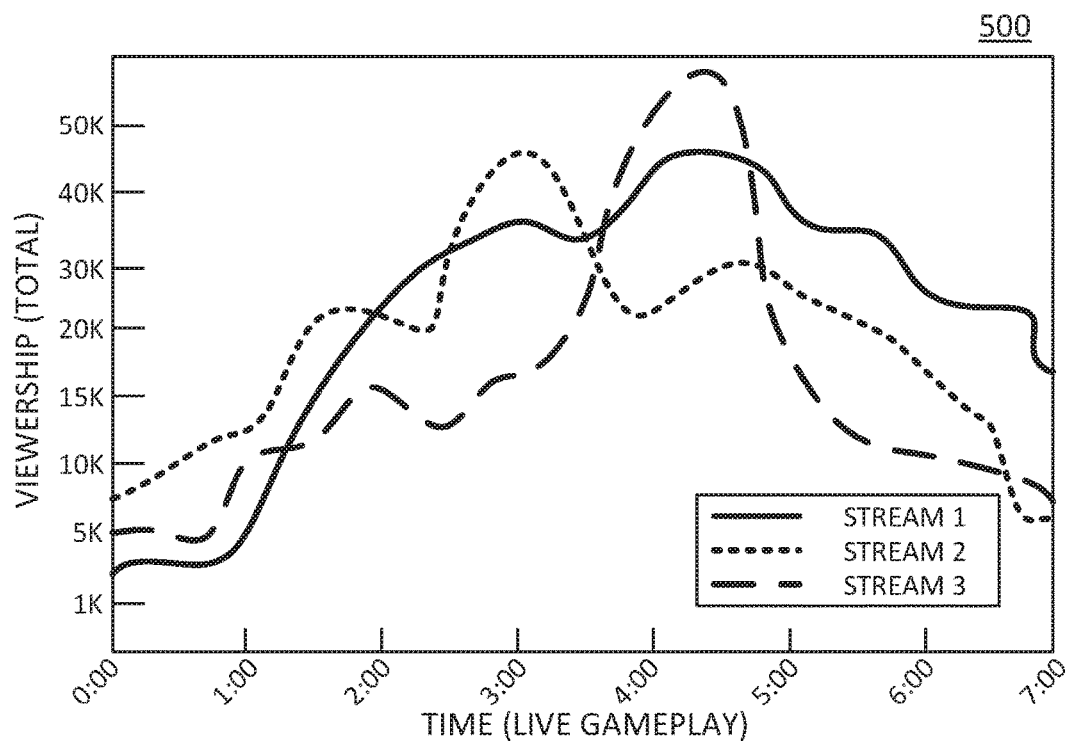
FIG. 5 illustrates a graph of viewership for respective media streams during live game play in the game session.

FIG. 5 illustrates a graph 500 of viewership for one of media streams 1, 2, and 3 during live game play in a game session. Here, the viewership for media streams 1-3 reflects a number of users accessing or viewing the media stream at a given time of live game play.

Figure 6:
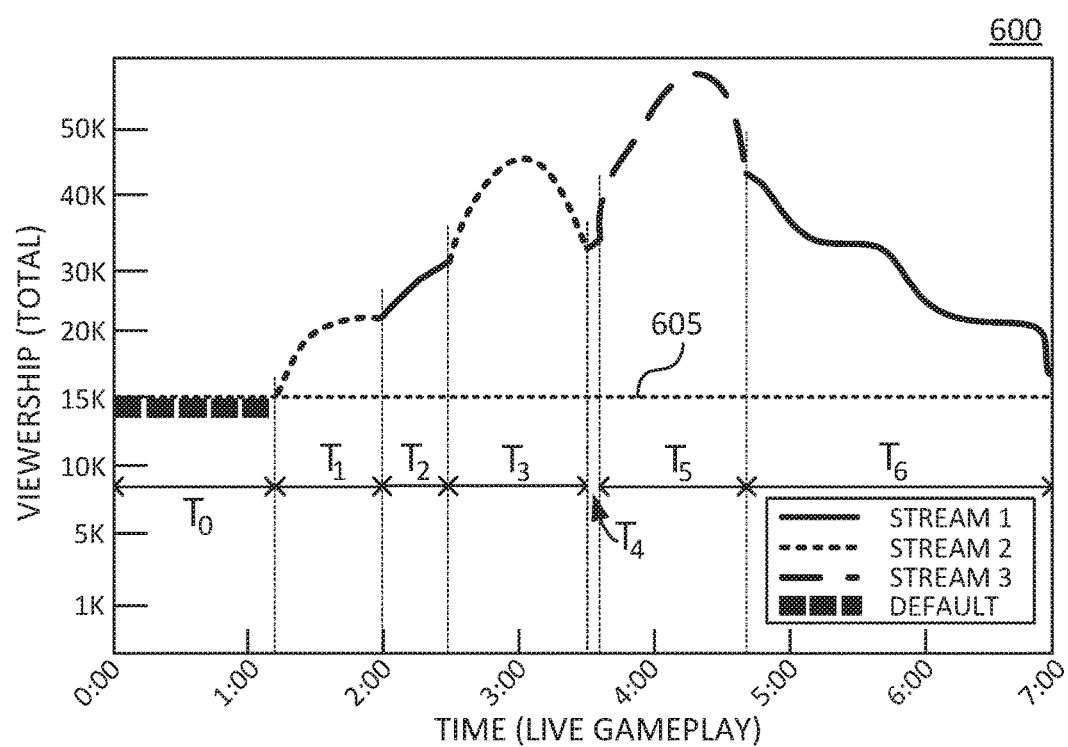
FIG. 6 illustrates a graph of selected portions of the media streams shown in FIG. 5.

FIG. 6 illustrates a graph 600 of selected portions of the media streams shown in FIG. 5—namely, media streams 1-3. The selected portions of media streams 1-3 corresponds to respective time periods, T1-T6, the media stream is selected for broadcast by the spectator channel. In particular, graph 600 shows selection of media streams 1-3 based on a priority rank that favors a higher number of viewers in the time period.

In addition, graph 600 also illustrates a threshold value 605, shown as a dash line. Threshold value 605 sets a minimum value for viewership (e.g., 15K viewers), below which value a default stream is assigned as the spectator stream. Put differently, stream integration engine 305 performs the above-discussed operations and further compares the spectator/player values for respective media streams to threshold 605. If the spectator/player values are below threshold 605, stream integration engine 305 designates a default media stream. Notably, the default media stream may include one of media stream 1-3, or it may be a different media stream altogether.

As shown, the default media stream is selected to broadcast for time period T0, media stream 2 is selected to broadcast for time periods T1 and T3, media stream 1 is to broadcast for time periods T2, T4, and T6, and media stream 3 is des to broadcast for time period T5. In operation, stream engine 305 compiles and integrates portions of the default stream and media streams 1-3, for respective time periods T1-T6, and broadcasts the portions as spectator channel 320, discussed above.

Although graph 600 illustrates ranking the media streams based on a current number of viewers, it is appreciated the priority ranking techniques may be modified to prioritize the media streams based on changes in the viewership for a given time period. In this fashion, the media streams may be ranked according to a trending popularity, where large increases in a short time period correspond to a higher or greater trend.

Figure 7:
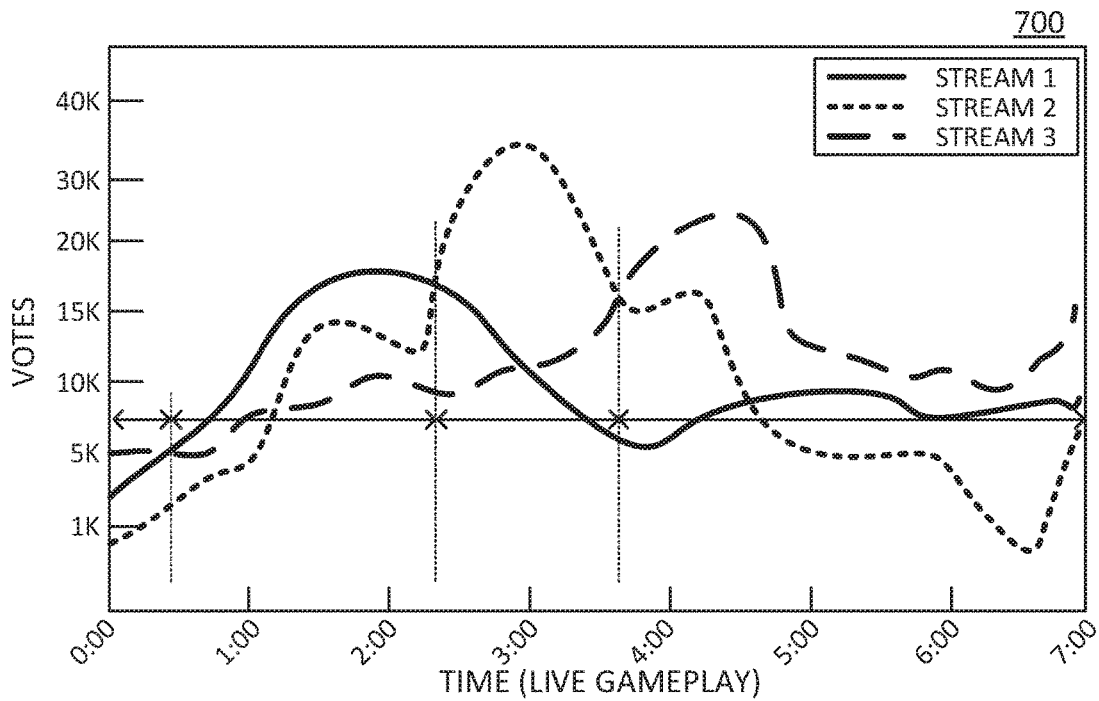
FIG. 7 illustrates a graph of a number of votes received for respective media streams during live game play in the game session.

FIG. 7 illustrates a graph 700, showing a number of votes received for media streams 1, 2, or 3 during live game play in a game session. Here, the number of votes for media streams 1-3 reflects a user vote through, for example, a voting interface, and a total number of votes for respective media streams at a given time of live game play.

Figure 8:
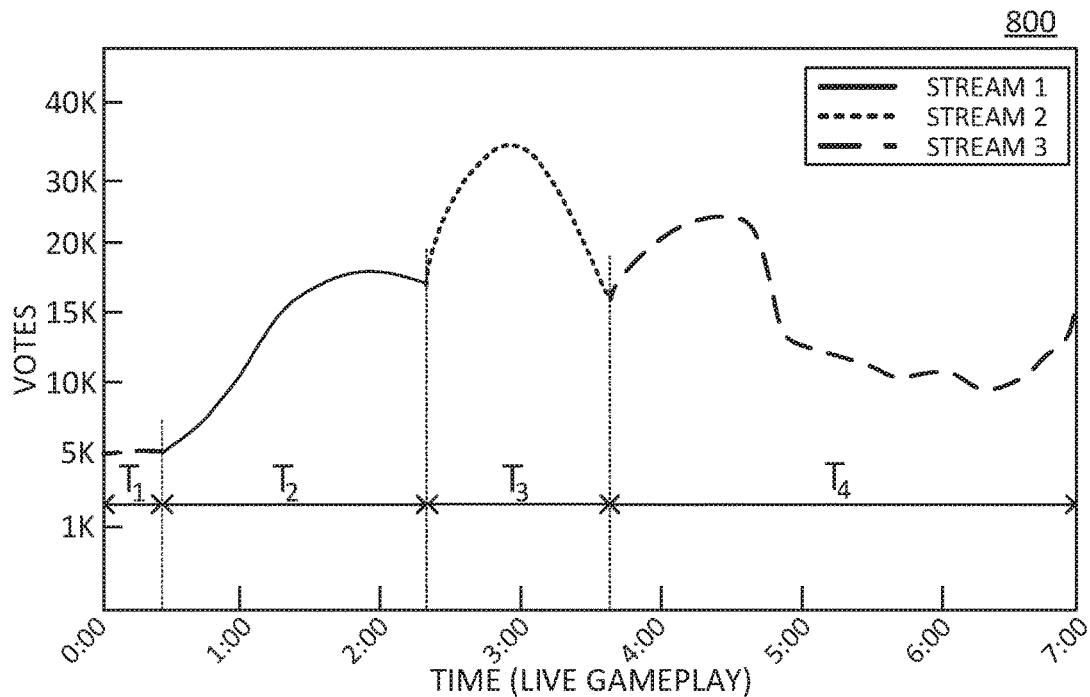
FIG. 8 illustrates a graph of portions of the media streams shown in FIG. 7, further showing the portions selected for broadcast based on the number of votes received for time periods of the game session.

FIG. 8 illustrates a graph 800, showing portions of one of media streams 1, 2, or 3 designated as the spectator stream based on the number of votes in a given time period, T1-T4. Stream integration engine 305 performs the above-discussed operations regarding spectator/player values and selects portions of media streams 1-3 to broadcast for time periods T1-T4 based a priority rank that favors a higher number of votes. As discussed above, the priority ranking techniques may be modified to prioritize the media streams based on changes in votes for a given time period, rather than an absolute value in the time period, as is appreciated by those skilled in the art.

Figure 9A:
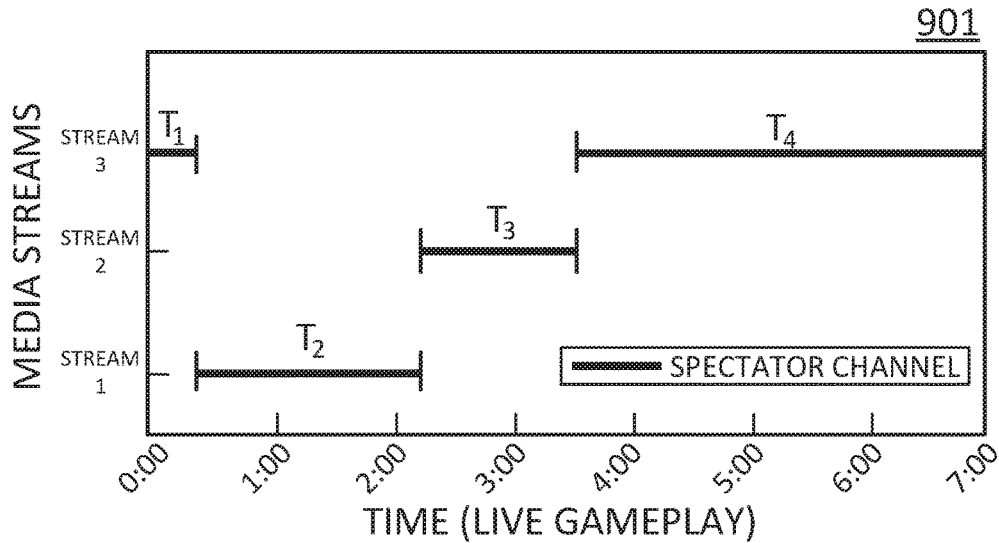
FIG. 9A illustrates a graph of a spectator channel that broadcasts portions of the media streams for time periods of the game session.
Figure 9B:
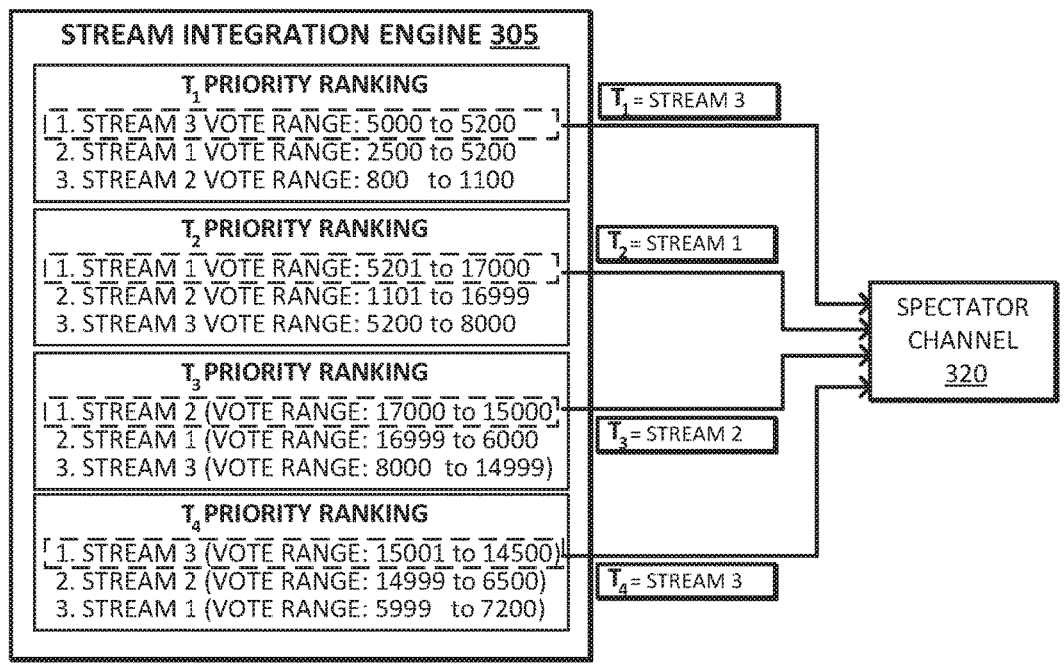
FIG. 9B illustrates a block diagram of a priority ranking used to select the portions of the media streams shown in FIG. 9A.

FIG. 9A illustrates a graph of a spectator channel that broadcasts portions of media streams 1-3 for time periods T1-T4 during live gameplay in a game session. As discussed, stream integration engine 305 selects portions of media streams 1-3 to broadcast for a given time period of live game play based on its priority ranking and compiles such portions of the media streams into a spectator channel, as illustrated FIG. 9B illustrates a block diagram of a priority ranking used to select the portions of the media streams shown in FIG. 9A. Here, stream integration engine 305 prioritizes streams 1-3 according to a rank of 1, 2, or 3 for each time period T1-T4. For each time period, the stream assigned to rank 1 is selected for broadcast by the spectator channel 320.

Notably, in some embodiments, spectator integration engine 305 may also integrate the selected portions of the media streams into a highlight media stream, which can be broadcast by spectator channel 320 over the multi-user platform for subsequent viewing after the game session.

Figure 10:
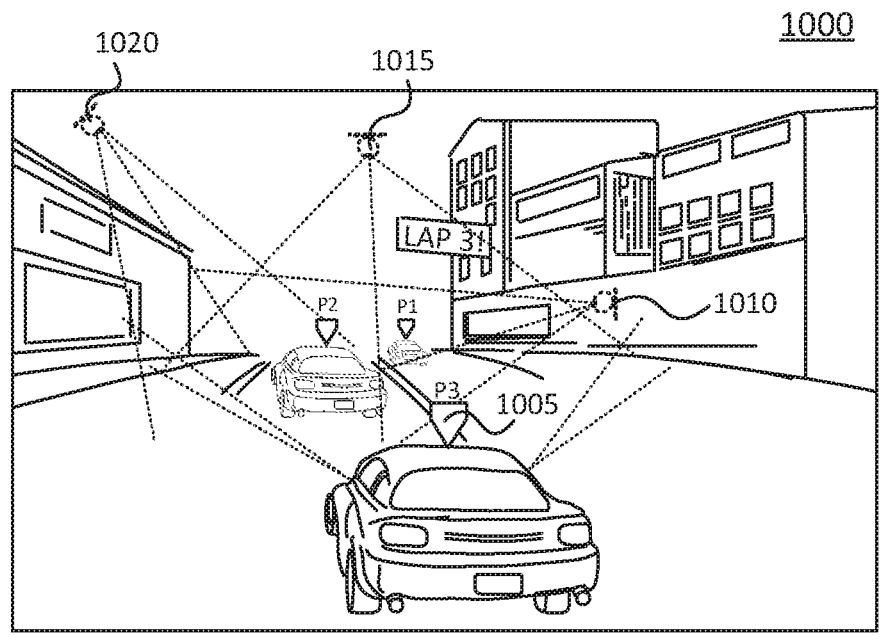
FIG. 10 illustrates a graphical view of live game play for a game session, showing different viewing angles for corresponding media streams.

FIG. 10 illustrates a graphical view 1000 of live game play for a game session, showing different viewing angles for corresponding media streams. In particular, graphical view 1000 shows views 1005, 1010, 1015, and 1020, where each view represents display content shown by a corresponding media stream.

Figure 11:
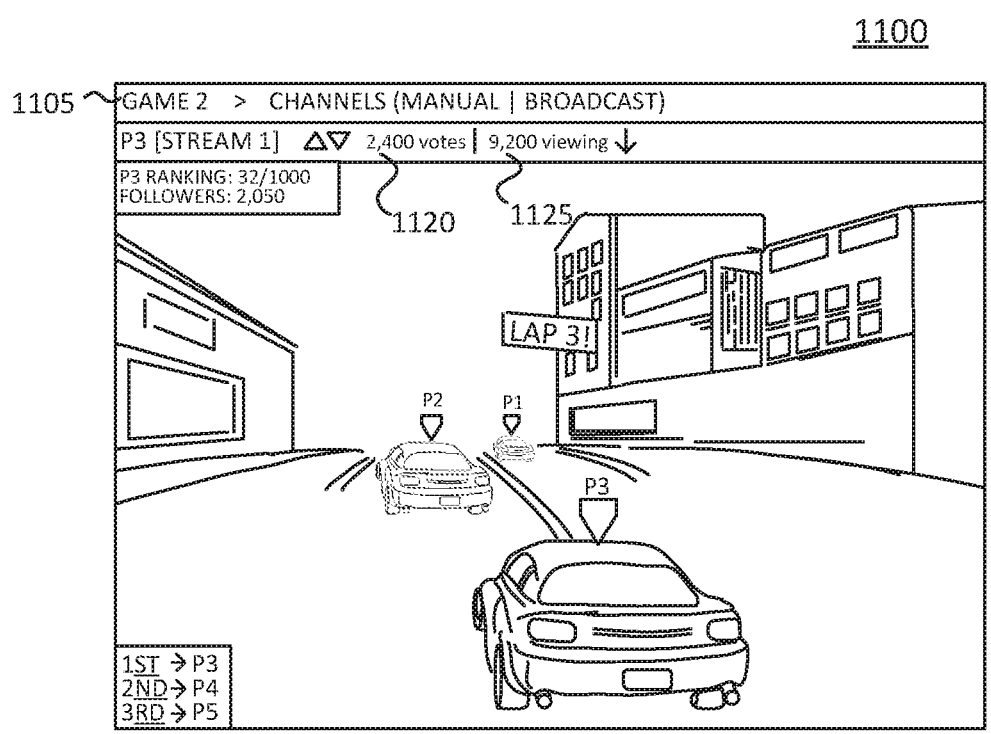
FIG. 11 illustrates a graphical view of the live game play shown in FIG. 10, showing display content for a media stream.

FIG. 11 illustrates a graphical view 1100 of the live game play shown in FIG. 10, showing display content for media stream 1. Here, media stream 1 is associated with player P3 and provides a third person perspective view of player P3. Graphical view 1100 also illustrates interactive elements that a user can manipulate during live game play. As shown, these interactive elements include a top menu 1105 that provides options to change games ("game 2") and switch channels ("channels"). Graphical view 1100 also illustrates a voting interface 1120 and a viewership interface 1125. Voting interface 1120 displays a current number of votes for media stream 1 and includes user-selectable elements (arrows) that can be selected by a user to vote up/down a media stream—here, media stream 1. Viewership interface 1125 displays a current number of users viewing media stream 1 as well as an arrow that indicates a recent trend in viewership for media stream 1. Here, the arrow points down indicating a downward trend because the current number of viewers recently decreased.

Figure 12:
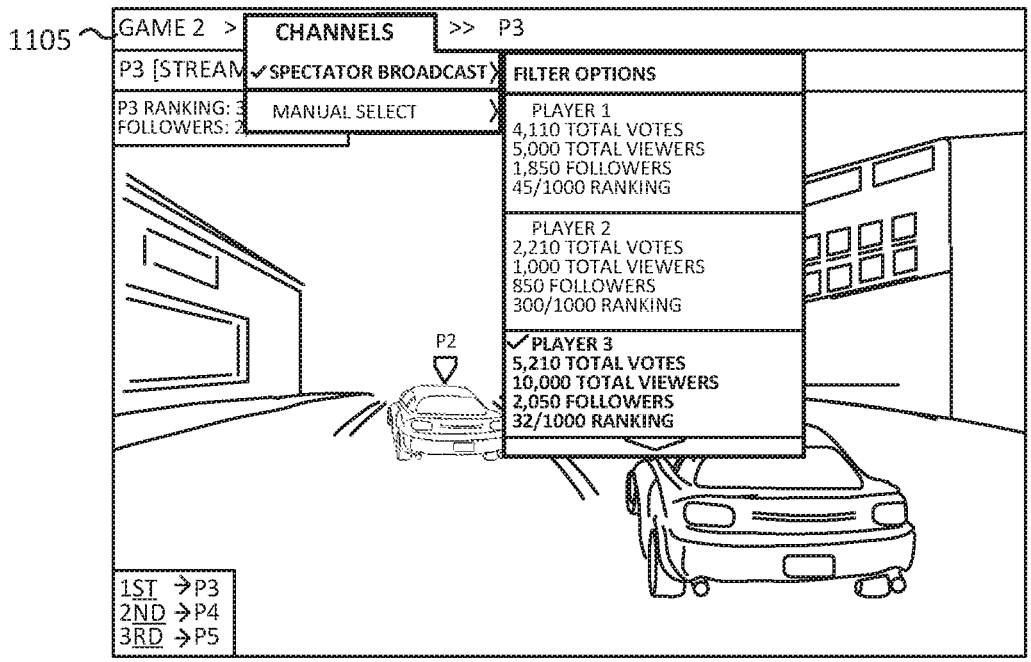
FIG. 12 illustrates a graphical view of the live game play shown in FIG. 11, further showing channel options to set a spectator channel to view media streams for a particular player.

FIG. 12 illustrates a graphical view 1200 of the live game play shown in FIG. 11, further showing channel options to set a spectator channel ("spectator broadcast") to view media streams for a particular player—here, Player 3. As shown, the user selects "channels" from the top menu 1105 to display a sub-menu of options for viewing a spectator channel or a manually selected channel. Here, the user selects the spectator channel, which causes display of a further sub-menu of filter options. The filter options instruct stream integration engine 305 to prioritize the media streams for a specific player and designate one of these media streams as the spectator stream during live game play. As discussed above, more than one media streams can display content for the same player (e.g., different views, etc.). Here, the user selects a filter option corresponding to Player 3, which instructs stream integration engine 305 to select and designate one of the media streams associated with Player 3 as the spectator stream for a given time period. As discussed, stream integration engine 305 continuously updates current spectator values/spectator attributes for the media streams associated with Player 3, compares these spectator values, determines a priority ranking for each media stream associated with Player 3 (e.g., based on then-current respective spectator values), and designates one of the media streams as the broadcast stream. Stream integration engine 305 further compiles or integrates portions of the media streams (e.g., the portions corresponding to the time period the media stream is designated as the spectator stream) into a spectator channel and broadcasts the spectator channel during live game play. Here, graphical view 1200 shows a spectator channel that prioritizes rank and selection of the media streams associated with to Player 3.

Figure 13:
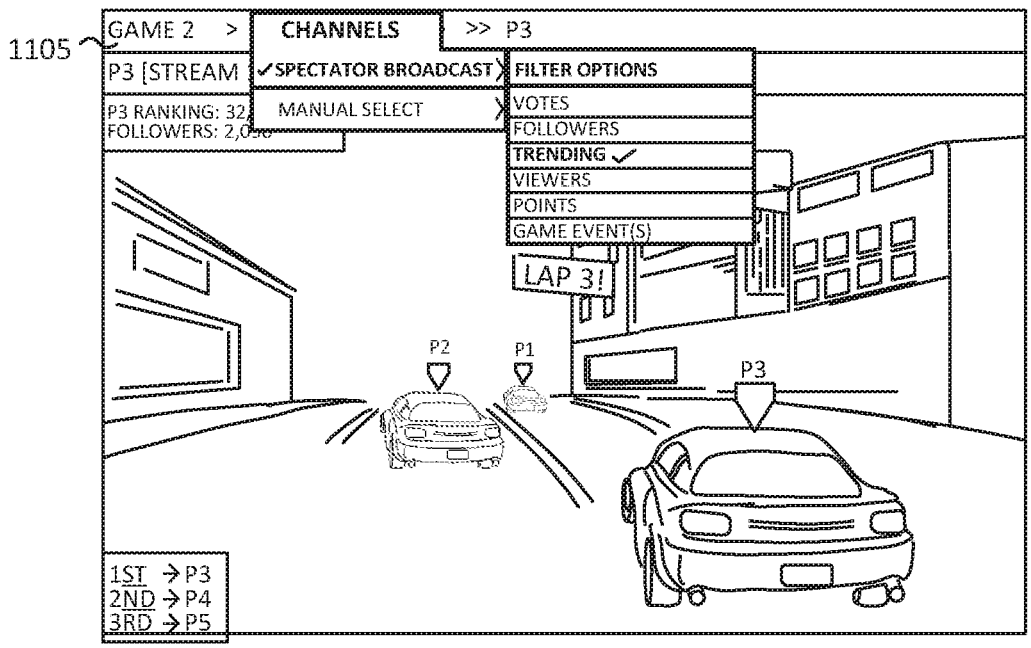
FIG. 13 illustrates a graphical view of the live game play shown in FIG. 11, further showing channel options to set the spectator channel to view trending media streams.

FIG. 13 illustrates a graphical view 1300 of the live game play shown in FIG. 11, further showing channel options to set the spectator channel to view trending media streams. As illustrated, the sub-menu for the spectator channel provides filter options to instruct stream integration engine 305 to prioritize and select media streams for broadcast based on a number of votes, a number of followers, trending (e.g., changes in votes, followers, points, or combinations thereof), and a number of points. The user selects the filter option corresponding to "trending", which instructs stream integration engine 305 to select and broadcast a media stream based on changes to spectator attributes (or player attributes) for a recent time period. Notably, this trending filter option can reflect individual or combinations of changes in spectator/player values.

Figure 14:
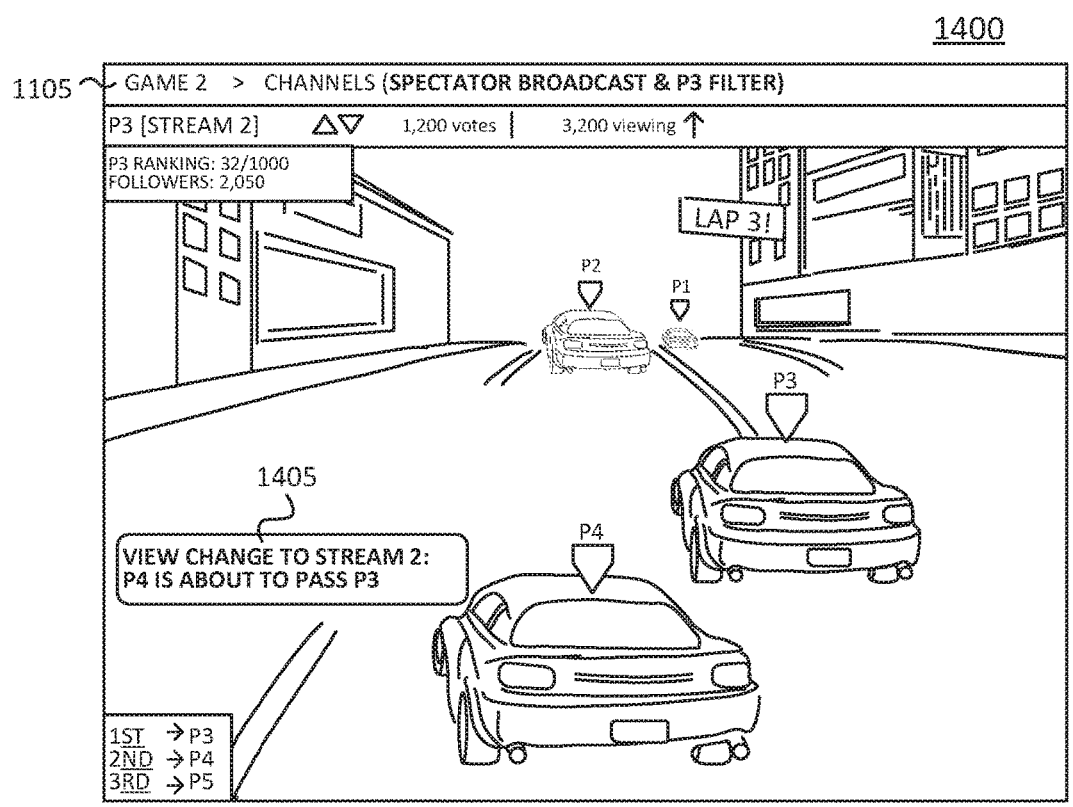
FIG. 14 illustrates a graphical view of the live game play shown in FIG. 11, further showing display content for a different media stream.

FIG. 14 illustrates a graphical view 1400 of the live game play shown in FIG. 11, further display content for a different media stream—namely, stream 2. For graphical view 1400, the current spectator channel set to "broadcast" and a player filter set to player 3. The display content shown by media stream 2 represents primary display content for player 4 (P4) and secondary display content for players 1 (P1), 2 (P2), and 3 (P3). In particular, media stream 2 displays a third person perspective view centered on player 4, and an offset third person perspective view of other players. As discussed above, primary and secondary labels and/or values are be used to delineate different views or viewing angles for an associated player(s), which may change during the course of live game play.

In operation, comparing FIG. 11 and FIG. 14, stream integration engine 305 switched the designated broadcast stream from media stream 1 (FIG. 11) to media stream 2 on the spectator channel because of a game event highlighted by notification 1405 (view change to stream 2: "P4 is about to pass P3"). As discussed above, stream integration engine 305 continuously updates spectator/player values for corresponding values/attributes during live game play. As illustrated by the change in view from FIG. 11 to the view in FIG. 14, stream integration engine 305 updated the game event value/attribute. Here, the game event represents a change in proximity or nearness in virtual game space between player 4 and player 3 for a given time period. During live game play, the change in proximity for the given time period represents player 4 passing player 3. As player 4 approaches player 3, stream integration engine 305 updates and increases the game event value associated with media stream 2. This increase for the game event value changes the priority ranking of the corresponding media stream (stream 2) for the given time period such that stream integration engine 305 selects media stream 2 to broadcast over the spectator channel. Depending on subsequent actions by the players, stream integration engine 305 may decrease the game event value and subsequently select a different media stream to broadcast based on an updated priority ranking for the media streams. In addition, stream integration engine may provide notifications such as notification 1405 to inform users viewing the spectator broadcast channel about changes to the currently displayed stream. The notifications can be triggered and provided in advance of or subsequent to such changes.

Collectively, FIGS. 10-14 show media content and perspective view of media streams, graphical interfaces, filter options, and other live game play information. These views are provided for purposes of illustration and discussion, not limitation. Further, while certain interfaces and graphical elements are displayed in a particular orientation and having a particular shape, these interfaces and graphical elements may be represented by any number of shapes, sizes, orientations, and the like, as is appreciated by those skilled in the art.

Figure 15:
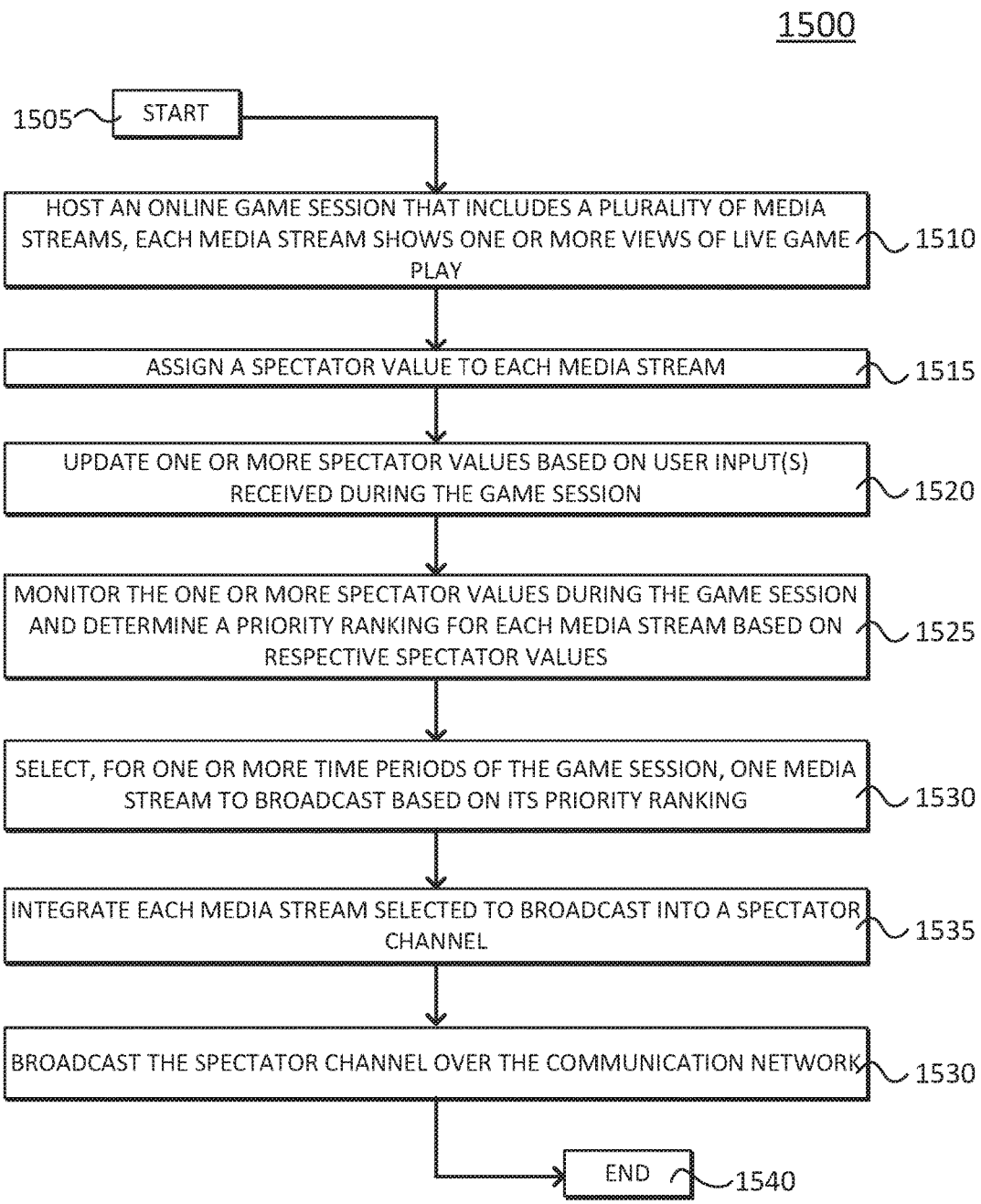
FIG. 15 illustrates an example simplified procedure for integrating media streams of live game play in a game session into a spectator channel.

FIG. 15 illustrates an example simplified procedure 1500 for integrating media streams of live game play in a game session into a spectator channel, particularly from the view of a multi-user system or platform. Procedure 1500 begins at step 1505 and continues to step 1510, where, as described in greater detail above a multi-user system hosts an online game session that includes a plurality of media streams, and each media stream may show a particular view of live game play. Next, at step 1515, the multi-user system assigns a spectator value to each media stream. As discussed above, the spectator value and/or spectator attribute may also include player values/attributes and generally represent a popularity or user interest in the respective media stream. The multi-user system further updates, at step 1520, the spectator values for respective media streams based on user input(s) received during the game session. The multi-user system monitors, at step 1525, respective spectator values for corresponding media streams during the game session to determine a priority ranking for each media stream. As discussed, the priority ranking can include weights and/or values assigned to the media streams which favor a greater popularity or interest in a media stream. Notably, the priority ranking is typically updated throughout the game session based on the live user inputs received to represent current interest in any given media stream.

Procedure 1500 continues to step 1530, where the multi-user system further selects one of the media streams to broadcast for a time period of the game session based on its priority ranking and, at step 1535, the multi-user system integrates each selected media stream into a spectator channel that is broadcast, at step 1540, over the communication network. Procedure 1500 subsequently ends at step 1540, but may continue on to step 1510 where the multi-user system hosts an online game session. Collectively, the steps in procedure 1500 describe techniques to improve a consumer's viewing experience for live online game play through a spectator channel that integrates and/or switches between views corresponding to multi-media streams based on live, dynamic user input or feedback received during game play.

It should be noted that certain steps within procedures 1500 may be optional, and further, the steps shown in FIG. 15 are merely examples for illustration. Certain other steps may be included or excluded as desired. Further, while a particular order of the steps is shown and executed from the perspective of a particular device or system, this ordering is merely illustrative, and any suitable arrangement of the steps and/or any number of systems, platforms, or devices may be utilized without departing from the scope of the embodiments herein.

The techniques described herein, therefore, provide interactive and immersive viewing experiences that compiles and/or integrates media streams associated with live game play in a game session into a broadcast channel that tracks a currently "most-popular" view shown by a given media stream based on user feedback received during the game session. This popularity or user interest can include numerous factors or attributes and may also include changes in a time period to reflect trending aspects for media streams (e.g., sudden increases or decreases in viewership).

While there have been shown and described illustrative embodiments that monitor media streams for a game session and provide an integrated spectator broadcast channel comprising portions of currently popular media streams, it is to be understood that various other adaptations and modifications may be made within the spirit and scope of the embodiments herein. For example, the embodiments have been shown and described herein with relation to certain systems, platforms, devices, and modules (e.g., engines, etc.). However, the embodiments in their broader sense are not as limited, and may, in fact, any of these systems, platforms, devices and/or modules may be configured (or exclude) with similar or the same functionality.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
providing a multi-user platform for hosting a game session over a communication network, the game session including a plurality of media streams that show one or more views of live game play for the game session;
assigning each media stream as one of a primary media stream showing a first view of a player or a secondary media stream showing a second view of the player;
assigning a spectator value to each media stream for one or more time periods of the live game play, wherein the spectator value includes a weight that favors the primary media stream showing the first view of the player;
updating one or more spectator values for the plurality of media streams based on user inputs received during the live game play;
selecting one media stream to broadcast over a spectator channel for each time period based on the spectator values assigned to the plurality of media streams for the time period of the live game play; and
broadcasting the spectator channel over the communication network.

2. The method of claim 1, wherein the one media stream selected to broadcast over the spectator channel is a selected media stream, the method further comprising:
integrating the selected media stream for each of the one or more time periods of the game session into the spectator channel, and
wherein broadcasting the spectator channel further comprises broadcasting the selected media stream for each of the one or more time periods over the communication network.

3. The method of claim 1, further comprising:
providing a voting interface for the multi-user platform to receive the user inputs during the live game play.

4. The method of claim 1, further comprising:
monitoring a change in spectator values assigned to each media stream for the one or more time periods of the live game play, and
wherein selecting the one media stream to broadcast further comprises selecting the one media stream to broadcast based on the change in the spectator value for one of the one or more time periods.

5. The method of claim 1, further comprising:
comparing the spectator value to a threshold value, and
wherein selecting the one media stream to broadcast further comprises, selecting the one media stream to broadcast when the spectator value assigned to the one media stream meets or exceeds the threshold value.

6. The method of claim 5, wherein selecting the one media stream to broadcast further comprises, selecting a default media stream to broadcast when the spectator value assigned to the one media stream is less than the threshold value.

7. The method of claim 1, further comprising:
providing a notification that indicates a change between media streams selected for broadcast over the spectator channel.

8. The method of claim 1, further comprising:
associating one or more of the plurality of media streams with a player participating in the game session, and
wherein, the spectator value for each media stream associated with the player includes at least one of a number of users that follow the player, a change in the number of users that follow the player, a number of points awarded to the player, a change in the number of points awarded to the player, a proximity between the player and potential point awards, or a game event.

9. The method of claim 1, wherein the spectator value for one or more media streams includes at least one of a number of users accessing the one or more media streams, a change in the number of users accessing the one or more media streams, a number of users that follow a player associated with the one or more media streams, a change in the number of users that follow the player, a number of points awarded to the player, a change in the number of points awarded to the player, a proximity between the player and potential point awards, or a game event.

10. A multi-user system, comprising:
a network interface to communicate in a communication network;
a processor coupled to the network interface and adapted to execute one or more processes; and
a memory configured to store a process executable by the processor, the process when executed operable to:
host a game session over the communication network, the game session including a plurality of media streams that show one or more views of live game play for the game session;
assign each media stream as one of a primary media stream showing a first view of a player or a secondary media stream showing a second view of the player;
assign a spectator value to each media stream for one or more time periods of the live game play, wherein the spectator value includes a weight that favors the primary media stream showing the first view of the player;
update one or more spectator values for the plurality of media streams based on user inputs received during the live game play;
select one media stream to broadcast over a spectator channel for each time period based on the spectator values assigned to the plurality of media streams for the time period of the live game play; and
broadcast the spectator channel over the communication network.

11. The multi-user system of claim 10, wherein the one media stream selected to broadcast over the spectator channel is a selected media stream, wherein the process, when executed, is further operable to:
integrate the selected media stream for each of the one or more time periods of the game session into the spectator channel, and
wherein the process, when executed to broadcast the spectator channel is further operable to broadcast the selected media stream for each of the one or more time periods over the communication network.

12. The multi-user system of claim 10, wherein the network interface includes a voting interface, wherein the process, when executed, is further operable to:
receive user votes by the voting interface.

13. The multi-user system of claim 10, wherein the process, when executed, is further operable to:
monitor a change in spectator values assigned to each media stream for the one or more time periods of the live game play, and wherein the process, when executed to select the one media stream, is further operable to select the one media stream to broadcast based on the change in the spectator value for one of the one or more time periods.

14. The multi-user system of claim 10, wherein the process, when executed, is further operable to:
compare the spectator value to a threshold value, and
wherein the process, when executed to select the one media stream, is further operable to select the one media stream to broadcast when the spectator value assigned to the one media stream meets or exceeds the threshold value.

15. The multi-user system of claim 14, wherein the process, when executed to select the one media stream, is further operable to select a default media stream to broadcast when the spectator value assigned to the one media stream is less than the threshold value.

16. The multi-user system of claim 10, wherein the process, when executed, is further operable to:
provide a notification over the network that indicates a change between media streams selected for broadcast over the spectator channel.

17. A tangible, non-transitory, computer-readable media having software encoded thereon, the software, when executed by a processor, is operable to:
host a game session over a communication network, the game session including a plurality of media streams that show one or more views of live game play for the game session;
assign each media stream as one of a primary media stream showing a first view of a player or a secondary media stream showing a second view of the player;
assign a spectator value to each media stream for one or more time periods of the live game play, wherein the spectator value includes a weight that favors the primary media stream showing the first view of the player;
update one or more spectator values for the plurality of media streams based on user inputs received during the live game play;
select one media stream to broadcast over a spectator channel for each time period based on the spectator values assigned to the plurality of media streams for the time period of the live game play; and
broadcast the spectator channel over the communication network.

18. The tangible, non-transitory, computer-readable media of claim 17, wherein the one media stream selected to broadcast over the spectator channel is a selected media stream, wherein the software, when executed by the processor, is further operable to:
integrate the selected media stream for each of the one or more time periods of the game session into the spectator channel, and
wherein the software, when executed by the processor to broadcast the spectator channel is further operable to broadcast the selected media stream for each of the one or more time periods over the communication network.

19. The tangible, non-transitory, computer-readable media of claim 17, wherein the software, when executed by the processor, is further operable to:
monitor a change in spectator values assigned to each media stream for the one or more time periods of the live game play, and
wherein the software, when executed by the processor to select the one media stream to broadcast is further operable to select the one media stream to broadcast based on the change in the spectator value for one of the one or more time periods.

* * * * *